United States Patent [19]
Kerr et al.

[11] Patent Number: 5,478,434
[45] Date of Patent: Dec. 26, 1995

[54] DE-LAMINATOR APPARATUS AND METHOD WITH LEADER DIVERTER

[75] Inventors: Roger S. Kerr, Brockport; Hugh A. Cunningham, Penfield, both of N.Y.

[73] Assignee: Eastman Kodak Company, Rochester, N.Y.

[21] Appl. No.: 349,632

[22] Filed: Dec. 1, 1994

[51] Int. Cl.⁶ ..................................................... B32B 35/00
[52] U.S. Cl. .......................... 156/584; 271/280; 271/281; 271/285; 354/354; 430/256; 156/344
[58] Field of Search ...................... 156/344, 584; 271/280, 281, 285, 900; 354/354; 355/277, 278, 279, 311, 315; 430/256, 257, 258, 259, 260, 261, 262

[56] References Cited

U.S. PATENT DOCUMENTS

| | | | |
|---|---|---|---|
| 2,317,655 | 4/1943 | van den Broek | 271/285 |
| 3,017,179 | 1/1962 | Stuckens | 271/285 |
| 5,169,476 | 12/1992 | Silveira et al. | 156/584 X |
| 5,203,942 | 4/1993 | DeCook et al. | 156/230 |

FOREIGN PATENT DOCUMENTS

| | | | |
|---|---|---|---|
| 1-203158 | 8/1989 | Japan | 271/285 |
| 1-231047 | 9/1989 | Japan | 430/256 |
| 2165369 | 4/1986 | United Kingdom | 156/344 |

*Primary Examiner*—Mark A. Osele
*Attorney, Agent, or Firm*—Milton S. Sales

[57] ABSTRACT

A laminating system for bonding, to receiver stock, a lamination sheet of the type including a carrier, a material to be applied to the receiver stock, and a de-lamination leader associated with one edge of the lamination sheet; and for peeling the carrier from the receiver stock after the material has been applied to the receiver stock, includes a fuser through which a sandwich of receiver stock and lamination sheet, with material to be applied to the receiver stock between the carrier of the lamination sheet and the receiver stock, is fed with the de-lamination leader and the one edge facing in the direction of feed to apply the material to the receiver stock. A pair of driven nip rollers receive the de-lamination leader therebetween as the sandwich emerges from the fuser to tension the carrier, thereby breaking the bond between the carrier and the receiver stock. A movably mounted diverter is be provided for guiding the de-lamination leader from a path along which the sandwich emerges from the fuser to the nip rollers.

16 Claims, 5 Drawing Sheets

5,478,434

DE-LAMINATOR APPARATUS AND METHOD WITH LEADER DIVERTER

BACKGROUND OF THE INVENTION

1. Technical Field

This invention relates generally to de-lamination of two pieces of media which have been laminated together such as by the use of heat and/or pressure, and more particularly to the use of automatic means for guiding a de-lamination leader to a set of nip rollers to break the bond between the two pieces of laminated media and to peel apart the lamination.

2. Background Art

The KODAK Color Proofing Laminator is used to bond lamination sheets to receiver stock as a part of a color proofing system. The lamination sheets include a carrier and a layer of material to be applied to the receiver stock, which, in the case of Kodak Color Proofing Laminator, is a color donor. A lamination sheet is laid upon the receiver stock with the color donor side sandwiched between the carrier and the receiver stock.

As shown in FIG. 1, the leading edge of the lamination sheet and receiver stock sandwich 10 is fed into a laminator 12, and the sandwich passes completely through a set of heated rollers, not shown. The laminated sandwich sits on an exit table 14 undisturbed until the trailing edge is cool to the touch, whereupon the top-most carrier can be peeled away from receiver stock and from the transferred color donor. Further details of this type of lamination/de-lamination system can be found in commonly-assigned, U.S. Pat. No. 5,203,942, which issued to B. DeCook et al. on Apr. 20, 1993.

Peeling the carrier of this particular media before it is cool risks color donor "pick-off" from the receiver stock. That is, peeling too soon results in non-uniform transfer and the loss of highlight dots (dots of less than, say, 5% coverage) because the transferred materials do not have a chance to set up. Accordingly, the operator is instructed to allow sufficient time for the materials to cool down.

While the above-described KODAK Color Proofing Laminator works well for many intended materials, there are other materials that require peeling the carrier from the receiver stock while the sandwich is hot to prevent bonding between the carrier and the receiver stock. An operator would be required to quickly grasp the hot sandwich as it emerges from the roller, manually break the seal between the leading edge of the carrier and the receiver stock (such as with a thumb nail), and peel the carrier as the sandwich progresses from the rollers.

Because of the requirement to peel the media while it is still hot, and because of the fairly small window of time during which peeling may be effected without the risk of donor pick-off or bonding the carrier to the receiver stock, there is a need for an apparatus and method for automatically peeling the sandwich apart at the appropriate time after lamination.

DISCLOSURE OF THE INVENTION

It is an object of the present invention to provide an apparatus and method for automatically peeling the sandwich apart at the appropriate time after lamination.

According to a feature of the present invention, a laminating system for bonding, to receiver stock, a lamination sheet of the type including a carrier, a material to be applied to the receiver stock, and a de-lamination leader associated with one edge of the lamination sheet; and for peeling the carrier from the receiver stock after the material has been applied to the receiver stock, includes a fuser through which a sandwich of receiver stock and lamination sheet, with material to be applied to the receiver stock between the carrier of the lamination sheet and the receiver stock, is fed with the de-lamination leader and the one edge facing in the direction of feed to apply the material to the receiver stock. A pair of driven nip rollers receive the de-lamination leader therebetween as the sandwich emerges from the fuser to tension the carrier, thereby breaking the bond between the carrier and the receiver stock.

According to another feature of the present invention, a stripper bar is associated with the fuser such that the de-lamination leader and the carrier can be tensioned sharply around the stripper bar as the sandwich emerges from the fuser. The stripper bar is a predetermined distance from the fuser so that the sandwich is allowed to cool sufficiently to inhibit color pick-off while effecting de-lamination before the sandwich has cooled enough to cause bonding between the carrier and the receiver stock. Preferably, the de-lamination leader has a predetermined length; and the stripper bar and the nip rollers are separated by a distance at least as great as the length of the de-laminator leader. According to a preferred embodiment of the present invention, a cover is provided for the fuser, and the stripper bar is integral with the cover.

A mechanism may be provided for guiding the de-lamination leader from a path along which the sandwich emerges from the fuser to the nip rollers. The mechanism may include a movably mounted diverter having a first position in the path along which the sandwich emerges from the fuser and a second position out of the path, whereby the diverter, when in the path, intercepts the de-lamination leader as it emerges from the fuser to direct it toward the nip rollers and, when not in the path, allows the receiver stock which is separated from the carrier to continue along the path. Preferably, the diverter is pivotally mounted for movement between its first and second positions, and is urged toward its first position. Pressure from the de-lamination leader on the diverter moves the diverter to its second position. A web guide may be provided to lead the de-lamination leader from the diverter to the nip rollers.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed, in particular, to elements forming part of, or cooperating more directly with, apparatus in accordance with the present invention. It is to be understood that elements not specifically shown or described may take various forms well known to those skilled in the art. For the sake of discussion, but not limitation, the preferred embodiment of the present invention will be illustrated in relation to a laminating apparatus for making image proofs on a paper receiver stock, since the usual proofing practice is to make a hard copy of the image proof on paper. The present invention, however, is not limited to making hard copies of proof images on paper, since it can produce hard copies of images on a wide variety of media that may be used in the printing process.

Figure 1:
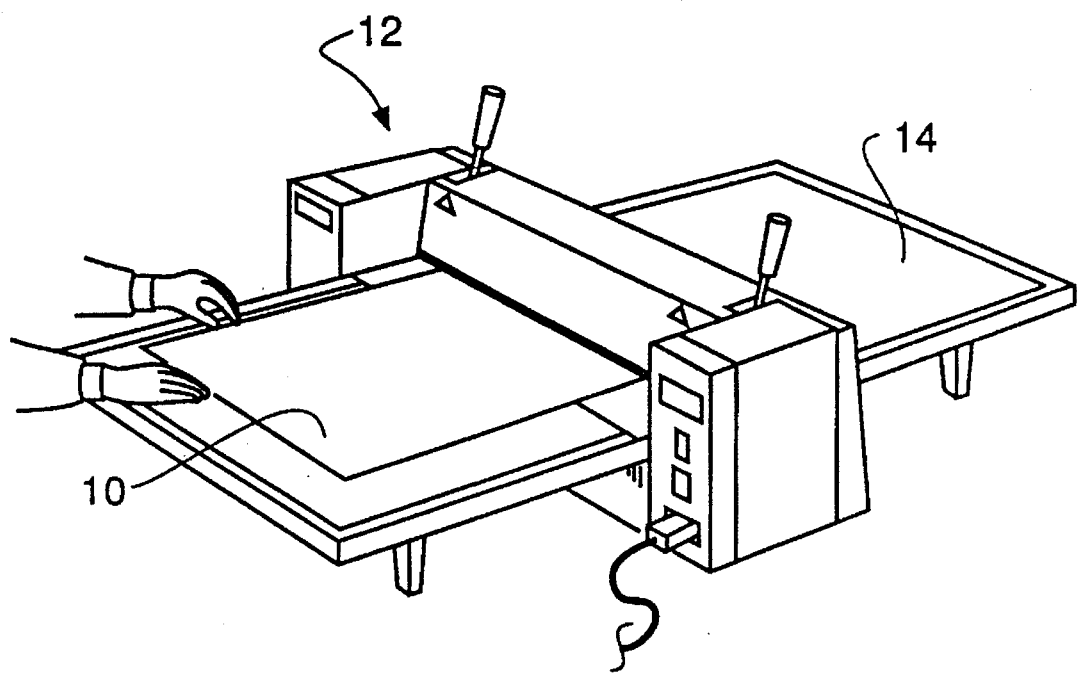
FIG. 1 is a perspective view showing a laminator known in the prior art.
Figure 2:
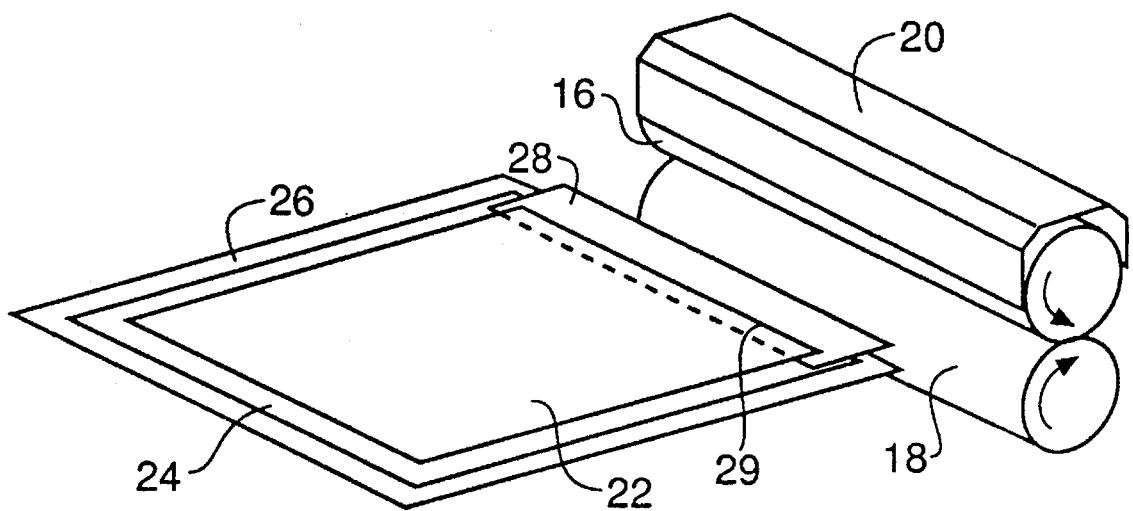
FIG. 2 is a perspective view showing the loading operation of a laminator according to a preferred embodiment of the present invention.

FIG. 2 shows a pair of heated pressure lamination rollers 16 and 18 of a laminator according to a preferred embodiment of the present invention. Roller 16 is provided with a cover 20 to protect the operator. The remainder of the laminator has been omitted from the illustration for clarity. An assembled sandwich of a lamination sheet 22 and receiver stock 24 is also shown in FIG. 2. Lamination sheet 22 includes a carrier and, on the side of the carrier facing the receiver stock, a layer of material to be applied to receiver stock 24 (such as color donor). The sandwich is assembled on a feed table (FIG. 1). Note that sandwich 10 has been illustrated as lying on an optional support sheet 26.

A de-lamination leader 28 has been inserted between the leading edge 29 of lamination sheet 22 and receiver stock 24. As will become evident further in this specification, leader 28 is provided to enable easy breakage of the bond between carrier and the receiver stock after lamination.

Leader 28 insulates lamination sheet 22 from receiver stock 24, preventing them from bonding at leading edge 29 of the lamination sheet. The leader also provides a region for a pair of nip rollers to grasp to separate the two portions of the sandwich. Operation of the nip rollers will be fully explained below. The material (color donor) to be applied to the receiver stock is laminated to the receiver stock when heat and pressure are applied to a heat-activated adhesive on the color donor.

Lamination rollers 16 and 18 contain heating elements that heat the roller surfaces. Pressure is applied to the rollers by an eccentric, shown in FIG. 1. When a lamination sheet is positioned on the receiver stock and fed into the moving rollers, the lamination sheet and receiver stock are heated and pressed together as they pass through the roller pair. Lamination transfers the adhesive and color donor from the temporary carrier to the receiver stock.

Figure 3:
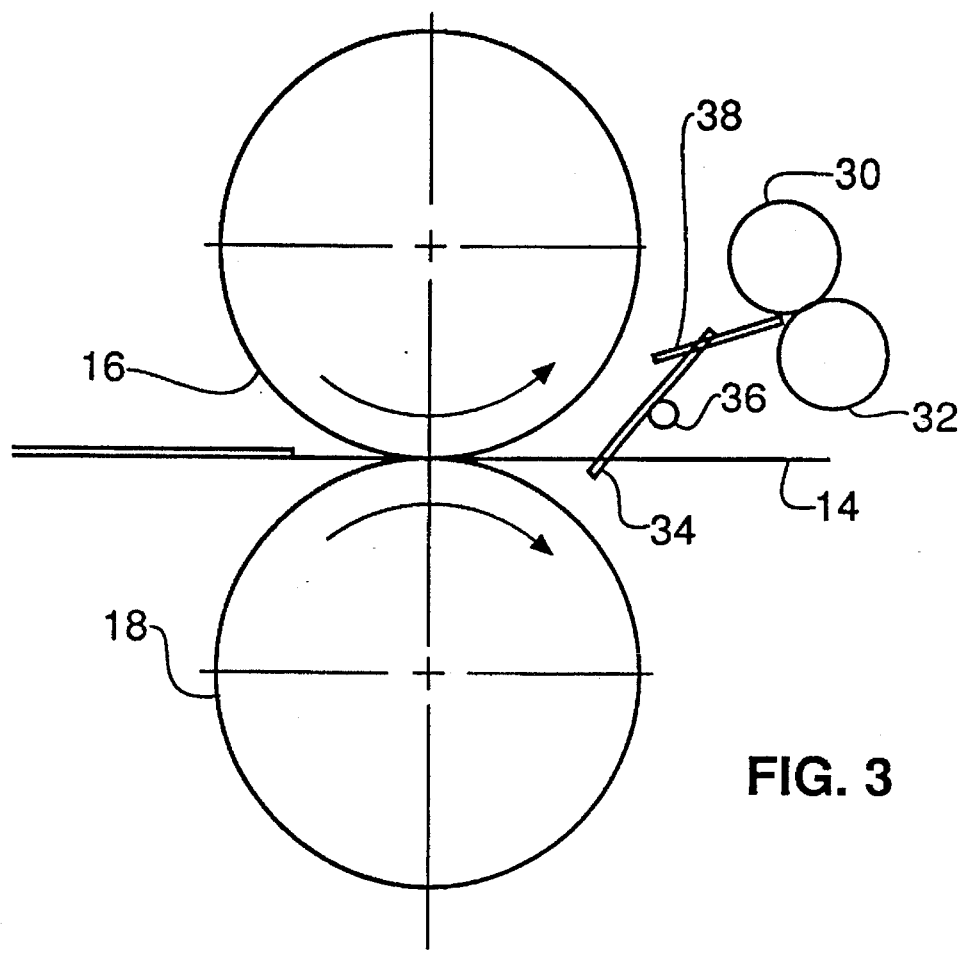
FIG. 3 is a schematic side elevational view showing details of operation of the laminator of FIG. 2.
Figure 4:
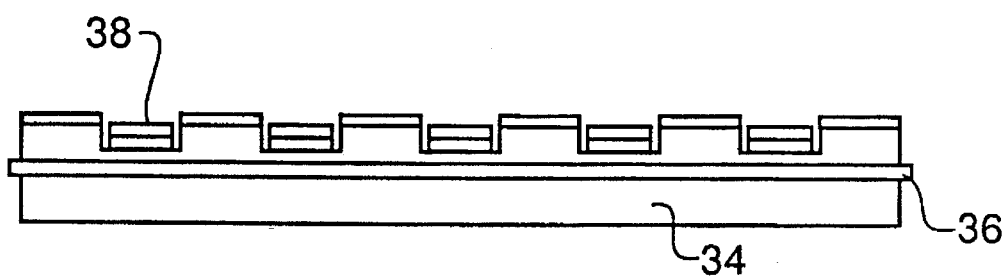
FIG. 4 is a front elevational view of a portion of the laminator of FIG. 3.

Referring to FIG. 3, a pair of driven nip rollers 30 and 32 are journalled above exit table 14 a short distance behind the nip of pressure roller pair 16, 18. As seen in side view in FIG. 3, and also in end-view in FIG. 4, a comb-shaped diverter 34 is pivotally mounted at 36, and is urged toward its position illustrated in FIG. 3 by gravity or spring means, not shown. A comb-shaped web guide 38 fits between the comb fingers of diverter 34.

Figure 5:
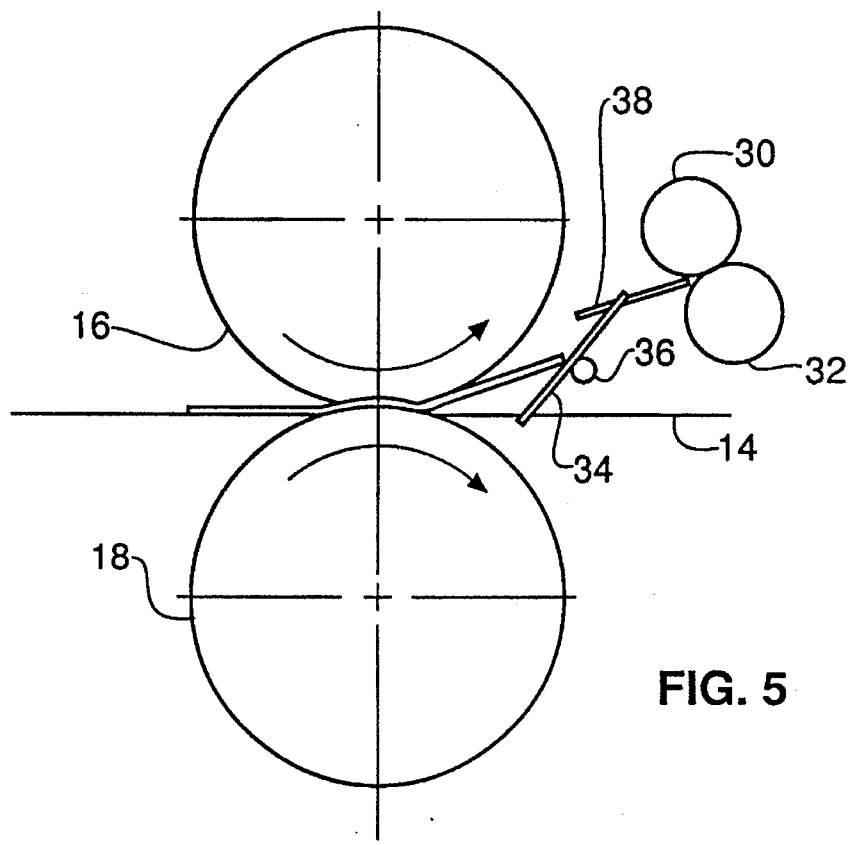
FIGS. 5–6 are schematic side elevational views showing progressive stages of operation of the laminator of FIG. 3.
Figure 6:
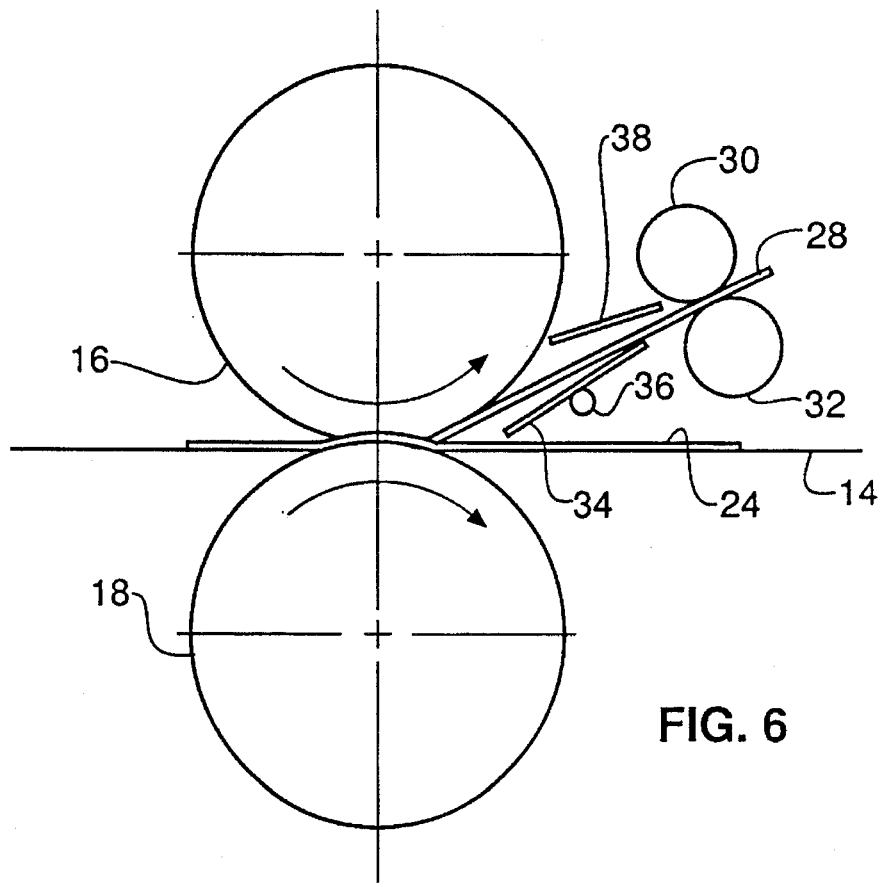

As the laminated sandwich emerges from the nip of roller pair 16, 18, de-lamination leader 28 engages diverter 34. Continued feed of the leader forces the leader upwardly along the surface of the diverter (FIG. 5) until the leading edge of the leader engages web guide 38. Contact between the leader and the web guide drives diverter 34 around pivot 36, directing the leader into powered nip rollers 30 and 32 (FIG. 6).

As receiver stock 24 emerges from the nip of roller pair 16, 18, stiffness of the receiver stock causes it to continue along the surface of exit table 14 rather than being bent around the roller pair nip with de-lamination leader 28. When the leading edge of lamination sheet 22 reaches the nip of roller pair 16, 18, the carrier web of the lamination sheet is carried around the nip and up to nip rollers 30, 32. Thus, the carrier is automatically removed (stripped) from the receiver stock to cleanly separate the carrier from the receiver stock. When the carrier is peeled away, the color donor is left on the receiver stock.

Figure 7:
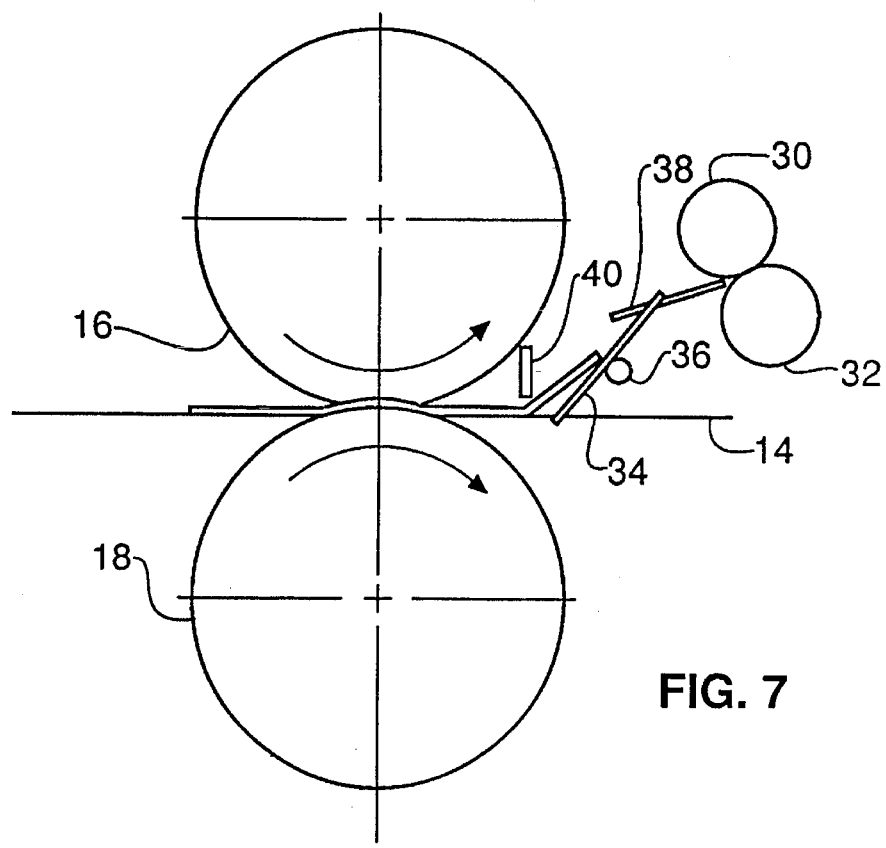
FIGS. 7 and 8 are schematic side elevational views showing progressive stages of operation of a second embodiment of a laminator according to the present invention.
Figure 8:
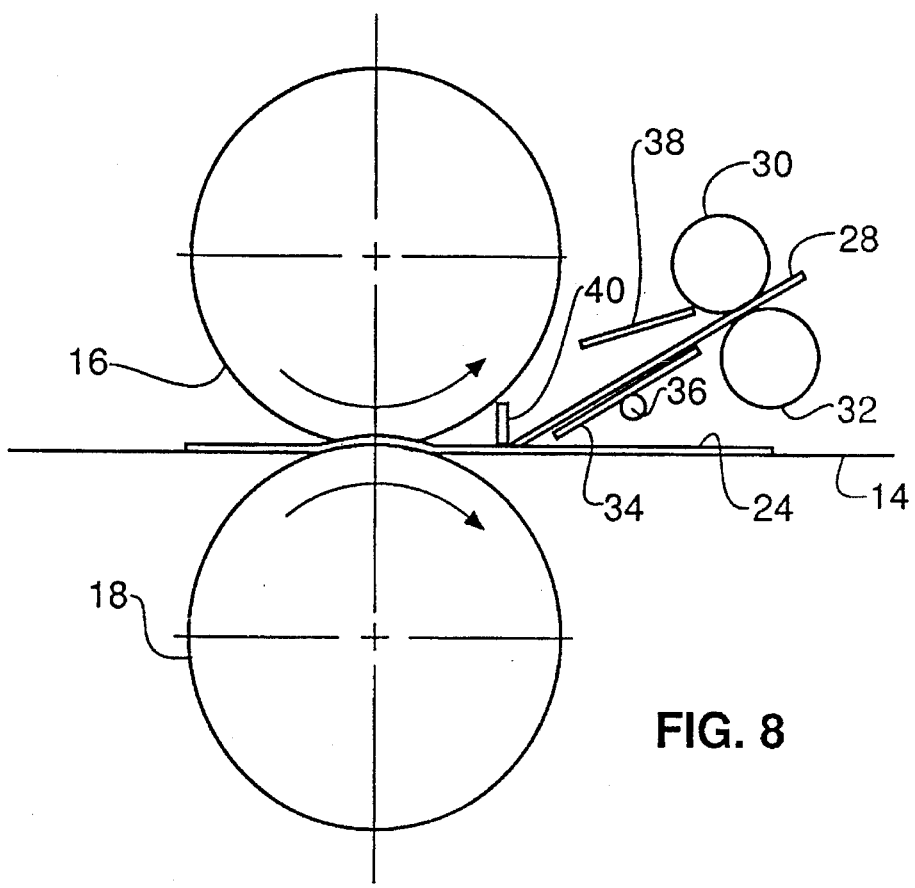
Figure 9:
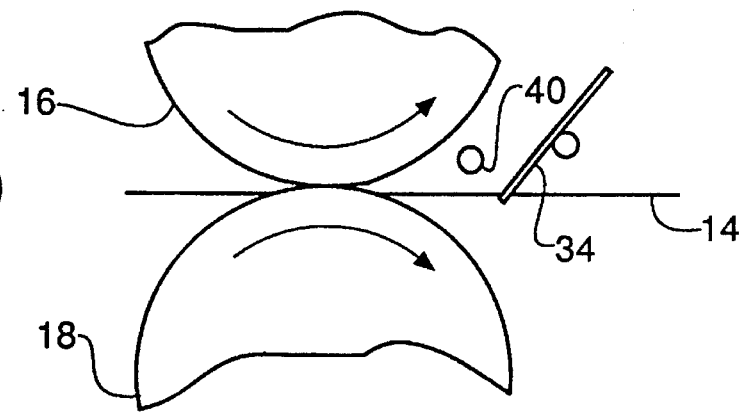
FIGS. 9–11 are schematic side elevational views showing alternative details of a laminator according to the present invention.
Figure 10:
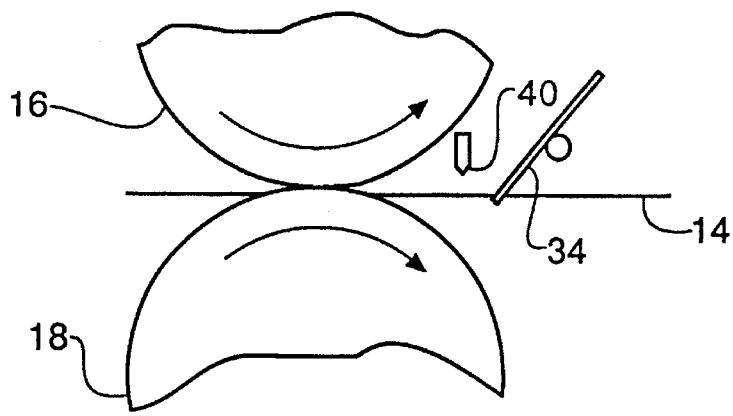
Figure 11:
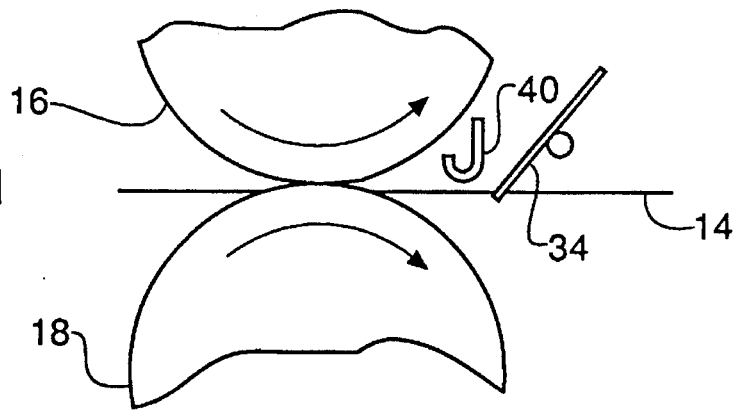

According to a second embodiment of the present invention, illustrated in FIGS. 7 and 8, a stripper bar 40 provides a small radius guide for separating the carrier from the receiver stock. The stripper bar is positioned a distance from heated pressure rollers 16 and 18 to allow sufficient cooling of the sandwich to prevent color pick-off, while effecting de-lamination before the sandwich has cooled enough to cause bonding between the carrier and the receiver stock. In a preferred embodiment, the distance between the stripper bar and the roller pair nip is less than about four inches to insure a peel temperature of about 215° F. for material being advanced at the rate of ten inches per minute. The stripper bar may take any of several forms, as schematically illustrated in FIGS. 9–11.

Figure 12:
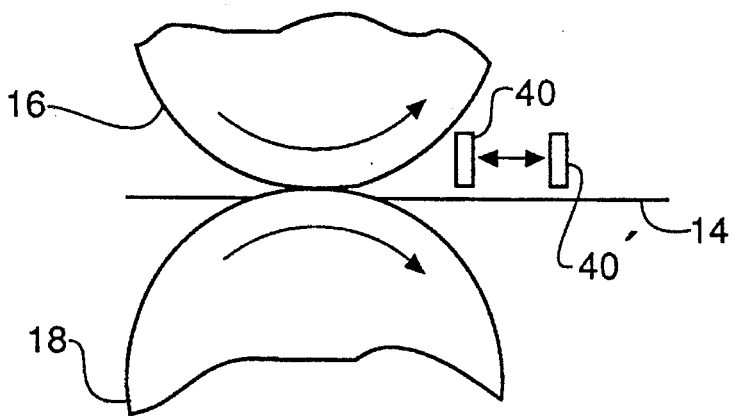
FIG. 12 is a schematic side elevational view showing yet another alternative detail of a laminator according to the present invention.

According to another feature of the present invention, stripper bar 40 may be provided with means to adjust its position along arrow 42 relative to the nip of rollers 16 and 18 so that the time duration between fusing and peeling is variable. Thus, an operator may optimize the peel temperature of the material. This feature is schematically illustrated in FIG. 12.

The invention has been described in detail with particular reference to preferred embodiments thereof, but it will be understood that variations and modifications can be effected within the spirit and scope of the invention.

What is claimed is:

1. A laminating system for bonding, to receiver stock, a lamination sheet of the type including a carrier and a material to be applied to the receiver stock, and for subsequently de-laminating the carrier from the receiver stock after the material has been applied to the receiver stock, said laminating system comprising:

a fuser through which a sandwich of the receiver stock and lamination sheet, with material to be applied to the receiver stock between the carrier of the lamination sheet and the receiver stock, is fed to apply the material to the receiver stock;

a pair of driven nip rollers which receive the carrier therebetween as the sandwich emerges from the fuser to tension the carrier, thereby breaking the bond between the carrier and the receiver stock; and a stripper bar associated with the fuser such that the carrier can be tensioned sharply around the stripper bar as the sandwich emerges from the fuser, said stripper bar being a predetermined distance from the fuser so that the sandwich is allowed to cool sufficiently to inhibit color pick-off while effecting de-lamination before the sandwich has cooled enought to cause bonding between the carrier and the receiver stock, said stripper bar being adjustably mounted for movement toward and away from the fuser, whereby the predetermined distance from the fuser is changeable to adjust the amount of cooling of the sandwich before peeling.

2. A laminating system as set forth in claim 1 wherein the fuser comprises a pair of heated pressure rollers.

3. A laminating system as set forth in claim 1 further comprising means for diverting the carrier from a path along which the sandwich emerges from the fuser to the nip rollers, whereby tension in the carrier applied by the nip rollers causes the carrier to separate from the receiver stock.

4. A laminating system as set forth in claim 3 wherein the diverting means comprises a movably mounted diverter having a first position in the path along which the sandwich emerges from the fuser and a second position out of the path, whereby the diverter, when in the path, intercepts the sandwich as it emerges from the fuser to direct it toward the nip rollers and, when not in the path, allows the receiver stock which is separated from the carrier to continue along the path.

5. A laminating system as set forth in claim 4 wherein the diverter is pivotally mounted for movement between its first and second positions.

6. A laminating system as set forth in claim 5 further comprising means for urging the diverter toward its first position, and wherein pressure from the carrier on the diverter moves the diverter to its second position.

7. A laminating system as set forth in claim 4 wherein said diverting means further comprises a web guide adapted to lead the carrier from the diverter to the nip rollers.

8. A laminating system comprising:

receiver stock;

a lamination sheet of the type including a carrier, a material to be applied to the receiver stock, and de-lamination leader associated with one edge of the lamination sheet, the de-lamination leader having a predetermined length;

a fuser through which a sandwich of the receiver stock and the lamination sheet, with material to be applied to the receiver stock between the carrier of the lamination sheet and the receiver stock, is fed with the de-lamination leader and the one edge facing in the direction of feed to apply the material to the receiver stock;

a stripper bar associated with the fuser such that the de-lamination leader and the carrier can be tensioned sharply around the stripper bar as the sandwich emerges from the fuser, said stripper bar being a predetermined distance from the fuser; and a pair of driven nip rollers which receive the de-lamination leader therebetween as the sandwich emerges from the fuser to tension the carrier, thereby breaking the bond between the carrier and the receiver stock, the stripper bar and the nip rollers being separated by a distance at least as great as the length of the de-lamination leader.

9. A laminating system as set forth in claim 8 further comprising a stripper bar associated with the fuser such that the de-lamination leader and the carrier can be tensioned sharply around the stripper bar as the sandwich emerges from the fuser, said stripper bar being a predetermined distance from the fuser so that the sandwich is allowed to cool sufficiently to inhibit color pick-off while effecting de-lamination before the sandwich has cooled enough to cause bonding between the carrier and the receiver stock.

10. A laminating system as set forth in claim 9 wherein said stripper bar is adjustably mounted for movement toward and away from the fuser, whereby the predetermined distance from the fuser is changeable to adjust the amount of cooling of the sandwich before peeling.

11. A laminating system as set forth in claim 8 wherein the fuser comprises a pair of heated pressure rollers.

12. A laminating system as set forth in claim 8 further comprising means for diverting the de-lamination leader from a path along which the sandwich emerges from the fuser to the nip rollers, whereby tension in the de-lamination leader applied by the nip rollers causes the de-lamination leader and the carrier to separate from the receiver stock.

13. A laminating system as set forth in claim 12 wherein the diverting means comprises a movably mounted diverter having a first position in the path along which the sandwich emerges from the fuser and a second position out of the path, whereby the diverter, when in the path, intercepts the de-lamination leader as it emerges from the fuser to direct it toward the nip rollers and, when not in the path, allows the receiver stock which is separated from the carrier to continue along the path.

14. A laminating system as set forth in claim 13 wherein the diverter is pivotally mounted for movement between its first and second positions.

15. A laminating system as set forth in claim 14 further comprising means for urging the diverter toward its first position, and wherein pressure from the de-lamination leader on the diverter moves the diverter to its second position.

16. A laminating system for bonding, to receiver stock, a lamination sheet of the type including a carrier, a material to be applied to the receiver stock, and a de-lamination leader associated with one edge of the lamination sheet; and for de-laminating the carrier from the receiver stock after the material has been applied to the receiver stock, said laminating system comprising:

a fuser through which a sandwich of receiver stock and lamination sheet, with material to be applied to the receiver stock between the carrier of the lamination sheet and the receiver stock, is fed with the de-lamination leader and the one edge facing in the direction of feed to apply the material to the receiver stock;

a pair of driven nip rollers which receive the de-lamination leader therebetween as the sandwich emerges from the fuser to tension the carrier, thereby breaking the bond between the carrier and the receiver stock; and a stripper bar associated with the fuser such that the de-lamination leader and the carrier can be tensioned sharply around the stripper bar as the sandwich emerges from the fuser, said stripper bar being a predetermined distance from the fuser so that the sandwich is allowed to cool sufficiently to inhibit color pick-off while effecting de-lamination before the sandwich has cooled enough to cause bonding between the carrier and the receiver stock, said stripper bar being adjustably mounted for movement toward and away from the fuser, whereby the predetermined distance from the fuser is changeable to adjust the amount of cooling of the sandwich before peeling.

* * * * *